UNITED STATES PATENT OFFICE.

ROBERT UHL, OF MUNICH, GERMANY.

PROCESS FOR THE PREPARATION OF SOLUBLE HEAVY-METAL COMPOUNDS OF THIO-PROTEIN BODIES.

1,145,684.                    Specification of Letters Patent.       Patented July 6, 1915.

No Drawing.                  Application filed February 4, 1913. Serial No. 716,203.

*To all whom it may concern:*

Be it known that I, ROBERT UHL, chemist, a subject of the King of Bavaria, residing at 57 Arcisstrasse, Munich, Kingdom of Bavaria, German Empire, have invented a new and useful Process for the Preparation of Soluble Heavy-Metal Compounds of Thio-Protein Bodies; and I do hereby declare the following to be a full, clear, and exact description of the same.

It is known that thio-protein compounds are obtained by the action of carbon disulfid or alkali sulfocarbonates on proteids such as fibrin, casein, myosin, keratin or glue. The thio-glutin combines with lime or baryta and gives off the sulfur by the action of an alkaline lead solution. The thio-casein compound forms with acid lead acetate an unstable, insoluble compound and the thio-fibrin compound gives a red compound lead derivative insoluble in acetic acid.

It has now been found that the thio-protein compounds or the thio-compounds of the hydrolytic decomposition products of proteid, furnish valuable therapeutic compounds with other heavy metals besides lead. In contrast to the lead compound these new compounds are soluble in water or in very dilute solutions of alkalis; they possess the important property that they are not flocculated either by physiological sodium chlorid solution or by blood serum, they exhibit no corrosive action and are not poisonous and they are also distinguishable from the originating substances, that is the thio-proteids, by their considerably greater stability. Owing to its insolubility, the lead compound is unable to exert any antiseptic or bactericidal action, whereas the new metallic compounds have a powerful antiseptic and bactericidal effect. The new cupro-peptone compound is, for example, superior to sublimate in its action in *Staphylococcus aureus*, if the metallic concentration in the agar plate mixtures be compared, and the non-poisonous character of, for instance, the cupro-peptone compound is shown by the fact that rabbits which have received intravenous injections of the cupro-peptone compound containing 3 to 4 times the amount of copper which, in any other form, would be fatal, have increased in weight after 6 weeks. While the original thio-glutin compound uncombined with metals above referred to is claimed to possess antiseptic properties, it did not necessarily follow that the new metallic compounds would also have these properties; and moreover the possibility of preparing the metallic compounds is also unexpected, in view of the behavior of thio-glutin toward alkaline lead solution. As mentioned, however, the new heavy metal compounds have a particularly strong antiseptic and bactericidal action and present the great advantage of showing the special specific properties of the corresponding heavy metals. Even apart from the peculiarity of antiseptic action, the new metallic compounds are superior to thio-glutin in point of their far wider applicability. The thio-glutin compound on account of its jelly like character cannot be employed in the same manner and to the number of therapeutic uses as the new metallic compounds, that is, for example, for intravenous injections.

Proteids of all kinds: true egg albumen, casein, or fission products like peptone, can be used as the protein compounds employed in the present process. The proteids, or substances analogous thereto, are dissolved in media possessing an alkaline reaction, and the sulfur carbon compounds are allowed to act on the solutions. For dissolving the proteids use may be made of alkali metal hydroxids, alkali metal carbonates, any salts having an alkaline reaction, or calcium hydroxid, and carbon oxysulfid or carbon disulfid may be used as the sulfur carbon compound. The resulting products are, if necessary, freed from the excess of sulfur carbon compound in a suitable manner. Carbon disulfid, for example, is driven off by warming, and carbon oxysulfid escapes in the gaseous form. The new sulfur compounds are then treated while in alkaline solution with salts, oxids or hydroxids of all heavy metals or with the metals themselves, except lead or its compounds. The resulting compounds are soluble and can be thrown down from solution by organic precipitants or the like. They are not precipitated by either physiological salt solution or blood serum.

*Example I.*—A stock solution is prepared consisting of 10 grams of Witte's peptone dissolved in 100 cc. of a 20 to 30% solution of caustic soda; or weaker solutions may also be taken. After filtration, the filtrate is treated with about 5 cc. of carbon disulfid and shaken up energetically for some time. Gentle warming is advantageous, preferably at a temperature at which no appreciable decomposition of the protein is produced. If the reaction is complete the product may be used for preparing the copper compound. In order to test if the reaction is complete a portion of the reaction product is treated with an ammoniacal solution of copper sulfate, whereupon a clear change should occur in the color of the metallic compound. A precipitant, for example, ether-alcohol or acetone is then added, and the precipitate is, if necessary, analyzed after being washed with water for the purpose of ascertaining if a suitable quantity of copper has entered the product. After having ascertained from a portion of the sulfur compound that a suitable quantity of copper may combine with it I prepare the copper compound in the following way: I mix the sulfur compound prepared in the described way with 8 grams of ammoniacal copper acetate dissolved in, for instance 120 cc. of water. The copper compound is then precipitated with 150 cc. of acetone. The product can be redissolved in alkali, for instance with 100 cc. of 1% caustic potash solution, then reprecipitated with an organic precipitant, for example alcohol-ether, and finally washed until the alkaline reaction has disappeared the excess of the reagents being also removed at the same time. The resulting copper compound contains about 20% of copper and 12% of sulfur.

*Analysis.*

0.2114 grm. gave 0.0548 grm.   CuO=20.71% Cu.
0.2276  "    "  0.0583  "      "  =20.47%  "
0.1901  "    "  0.1563  "      BaSO$_4$=11.95% S.

In the preparation of the peptone-silver compounds, a solution of silver chlorid in ammonia is used, about 8 grms. of silver chlorid dissolved in 100 cc. of ammonia (sp. gr. 0.9), being taken for use with the sulfurized stock solution. In other respects the procedure is the same. The silver compound contains about 41% of silver and 6% of sulfur.

*Analysis.*

0.3036 grm. gave 0.1669 grm.   AgCl =41.37% Ag.
0.4372  "    "   0.2390  "       "  =41.11%  "
0.2309  "    "   0.0992  "     BaSO$_4$= 5.90% S.

In the preparation of the peptone-mercury compounds use is made, for example, of potassium-mercury iodid or of another mercury compound not decomposable by alkalis, about 12 grms. of potassium-mercury iodid (Kahlbaum), dissolved in 12 cc. of water being taken for use with the sulfurized stock solution. In other respects the procedure is the same as for the copper and silver compounds. The same compound may be obtained, but more slowly, by maintaining the alkaline solution of the thio-peptone compound in intimate contact with metallic mercury. The sulfurized stock solution is agitated for 3 days along with 10 grms. of metallic mercury in a shaking apparatus running at 100 revolutions per minute. The liquid is then separated from the unabsorbed mercury and treated as above. The mercury compound contains about 38% of mercury and 6.5% of sulfur.

*Analysis.*

0.2436 grm. gave 0.1070 grm.   HgS=37.85% Hg.
0.2409  "    "   0.1080  "      "  =38.63%  "
0.3164  "    "   0.1592  "     BaSO$_4$= 6.52% S.

In the preparation of peptone-iron compounds powdered metallic iron is allowed to act on the alkaline solutions of the thioprotein compounds; or precepitated colloidal ferric hydroxid may also be used.

The sulfurized stock solution is agitated in a shaking apparatus along with 10 grms. of powdered metallic iron until the solution has acquired a deep green color, which occurs in about 1 to 2 hours. The liquid is separated from the undissolved metal, and the green ferro-compound is precipitated from the liquid, as above. The sulfurized stock solution may also be mixed with 8 grms. of precipitated collodial ferric hydroxid. After repeated stirrings the mixture is left to stand, and the liquid is decanted from the undissolved residue. The reddish ferri-compound is thrown down from the liquid as described above. The compound contains 18% of iron and 6% of sulfur.

*Example II.*—A stock solution is prepared consisting of 10 grms. of peptone dissolved in 50 cc. of a 5% solution of caustic soda, and after being filtered, the solution is placed in a high cylinder, into which a current of carbon oxysulfid is passed slowly for 3–4 hours in the warm (about 30°–40° C.), until the solution has turned golden yellow in color. The temperature should again be maintained at such a level that no extensive decomposition of the proteids can occur.

In the preparation of the copper compound, use is made for example, of ammoniacal copper acetate, 8 grms. of which dissolved in about 120 grms. of water being taken for use with a stock solution prepared and sulfurized as above. The ammoniacal copper acetate is poured slowly—within a few minutes—into the stock solution of thio-protein, with continued stirring, the temperature being kept at 15–20° C. The solution, which is orange colored at first becomes darker and darker until at last a clear, deep brown solution is obtained. After leaving it to stand for about 15 minutes, an equal volume of acetone is added. Since the metallic thio-protein compounds are only sparingly soluble in acetone of 50% strength, they will for the most part separate out in flocculent form. After filtration through a cloth filter they are repeatedly washed with acetone of 70% strength, and finally with absolute alcohol and ether. After pressing, the product is dried at room temperature and powdered. The yield (9 grms.) can, it is true, be increased by increasing the amount of precipitant used; but in such case the product will be less pure. It ought to dissolve without residue, in the proportion 1:5, in water which is just alkaline to litmus (one drop of caustic soda); and if such be not the case it must be dissolved in 1:10 caustic soda solution of 0.5% strength and reprecipitated.

To obtain an analogous silver compound, a solution of silver chlorid in ammonia is used; while for preparing a corresponding mercury solution, use is made of an aqueous solution of potassium-mercury iodid; and to obtain an iron compound the material is shaken up with powdered iron. The details and relative quantities being the same as mentioned with reference to the analogous compounds from carbon disulfid. The compound is soluble in weak alkali, for example solutions containing 0.5% of caustic potash. It contains 27% copper.

*Analysis.*

0.2000 grm. gave 0.1027 grm. CuO=27.35% Cu.
0.3184 " " 0.1076 " " =27.00% "

*Example III.*—A stock solution is prepared consisting of 5 grms. of casein dissolved in 100 cc. of a 5% solution of caustic soda, and treated with 2 cc. of carbon disulfid. The mixture is gently warmed and shaken, the reaction taking 3 days. The surplus carbon disulfid is preferably expelled by heating over the water bath. The completion of the reaction is ascertained in the same manner as described in Example I.

In the preparation of the copper compound the cooled golden yellow solution is treated with about 4 grms. of copper acetate dissolved in 60 cc. of ammonia (0.9% strength), and the clear brown solution is precipitated with either acetone or alcohol-ether and washed, the dissolving and precipitation being repeated. The compound contains about 18% of copper.

*Analysis.*

0.2904 grm. gave 0.0651 grm. CuO=17.91% Cu.

*Example IV.*—A stock solution is prepared, consisting of 130 cc. of horse serum albumin carefully mixed with 2.5 grms. of powdered sodium hydroxid over the water bath until complete solution is effected. This done, 5 cc. of carbon disulfid are added, and the procedure of Example III is followed. The compound contains 12.7% Cu.

*Analysis.*

0.3514 grm. gave 0.055 grm. CuO=12.71% Cu.

In the solid state the new cupro-compounds are dark brown. The copper is not thrown down from the solutions by sulfureted hydrogen. The compounds are soluble in alkalis but are not dissolved by acids these latter in fact precipitating them in the colloidal state but not decomposing them except at high temperatures. The peptone-copper compounds are also soluble in water.

The silver compounds are dark brown to black in color, are soluble in alkalis, and are not thrown down from the solutions by sulfureted hydrogen. They are, insoluble in acids, are precipitated in the colloidal state by acids, and are decomposed by the latter at high temperatures only. No silver chlorid is precipitated by adding sodium chlorid. The silver thio-peptone compounds are soluble in water.

The mercury compounds are deep black. They are soluble in alkalis, are precipitated in the colloidal form by acids, and are decomposed by the latter only at high temperatures. The peptone compounds are soluble in water, and the mercury is not precipitated by sulfureted hydrogen.

The ferri compounds are reddish, and the ferro compounds greenish in color.

The compounds are very completely and quickly absorbed by the human organism; and they can be employed in either the dissolved or undissolved condition. For example, the casein compounds can be applied to the skin in the undissolved condition.

The solutions of the thio-peptone heavy metal compounds are particularly valuable, being very readily soluble in water to form a perfectly neutral solution. In this way it is possible to employ the metals in the form of a highly concentrated solution.

The compounds have no corrosive action, and therefore do not irritate the tissues. They are also tasteless, on which account the iron compounds are specially suitable for nutrient purposes. The compounds have a powerful bactericidal effect.

I claim:—

1. The process of obtaining soluble heavy metal compounds of thio-protein bodies, consisting in first dissolving proteid substances in media possessing an alkaline reaction, then converting said proteid substances into thio-protein bodies by the action of a sulfur-carbon compound, and subsequently treating the thio-protein bodies while in alkaline solution with reagents, which will produce heavy metal compounds of same which are soluble in water and in very dilute solutions of alkalis, the resulting compounds being precipitated from the solution by organic precipitants.

2. The process for obtaining soluble copper compounds of thio-protein bodies, consisting in first dissolving a proteid substance in a solution of caustic soda, filtering the obtained liquid, then treating the filtrate with carbon di-sulfid, and subsequently treating the reaction product with an ammoniacal solution of copper sulfate the resulting compounds being thrown down from the solution by acetone.

3. The process for obtaining soluble copper compounds of thio-protein bodies, consisting in first dissolving a proteid substance in a solution of caustic soda, filtering the obtained liquid, then treating the filtrate with carbon di-sulfid and subsequently treating the reaction product with an ammoniacal solution of copper sulfate, the resulting compounds being thrown down from the solution by acetone, the resulting precipitate being dissolved in caustic potash solution and being reprecipitated with alcohol-ether.

4. A compound comprising a heavy metal combined with a thio-protein body, which compound is soluble in water and alkalis, not precipitated from their solution on addition of alkalis, common salt or blood serum and being precipitated from its aqueous solution on addition of ether-alcohol, acetone and acids.

5. A compound, comprising copper combined with a thioprotein-body, having brown to brownish dark color, soluble in water and alkalis, not precipitated from its solution on addition of alkalis, common salt and blood serum, being precipitated from its aqueous solution on addition of ether-alcohol, acetone and acids.

In testimony whereof, I have signed my name to this specification in the presence of two subscribing witnesses.

ROBERT UHL.

Witnesses:
  TENGEN MAX ROTH,
  A. W. CORTE.